(12) United States Patent
Murata (10) Patent No.: US 6,363,040 B1
(45) Date of Patent: Mar. 26, 2002

(54) CD-R MEDIUM RECORDING METHOD

(75) Inventor: Morihiro Murata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/658,128

(22) Filed: Sep. 8, 2000

(30) Foreign Application Priority Data

Sep. 20, 1999 (JP) .......................................... 11-265505

(51) Int. Cl.⁷ ................................................ G11B 7/00
(52) U.S. Cl. ................. 369/47.1; 369/47.21; 369/53.41
(58) Field of Search ............................ 369/47.1, 47.11, 369/47.15, 47.16, 47.2, 47.21, 47.22, 47.27, 53.1, 53.11, 53.17, 53.24, 53.37, 53.41, 59.1, 59.25

(56) References Cited

U.S. PATENT DOCUMENTS

| | | | | |
|---|---|---|---|---|
| 5,056,075 A | * | 10/1991 | Maruta et al. ............ | 369/44.29 |
| 5,414,688 A | * | 5/1995 | Inokuchi .................. | 369/47.12 |
| 6,091,683 A | * | 7/2000 | Yamaue ..................... | 369/47.2 |

* cited by examiner

*Primary Examiner*—Muhammad Edun
(74) *Attorney, Agent, or Firm*—Pillsbury Winthrop LLP (57) ABSTRACT

Detection is made of an outermost track on a CD-R medium for which track-descriptive information is not yet recorded in a PMA area and track-specific recording data are already recorded in a program area by a track-at-once scheme. It is then determined whether recording on the outermost track is terminated at the end of a first-type area where a Q subcode INDEX is at a value of 0 or is made up to a second-type area where the Q subcode INDEX is at a value of 1 or greater. If the recording on the outermost track is terminated at the end of the first-type area represented by the Q subcode INDEX value 0, the track-specific recording data are additionally written onto the outermost track starting at the beginning of the second-type following the first-type area and the track-descriptive information for the outermost track is recorded into the PMA area. If the recording on the outermost track is made up to the second-type area represented by the Q subcode INDEX value 1 or greater, the track-descriptive information for the outermost track is recorded into the PMA area without the track-specific recording data being additionally written onto the outermost track. Such arrangements allow a main body of a music piece to be additionally written onto an outermost track which has only a blank segment or inter-music-piece signal recorded thereon.

6 Claims, 8 Drawing Sheets

CD-R MEDIUM RECORDING METHOD

BACKGROUND OF THE INVENTION

The present invention relates generally to methods of recording onto CD-R media, and more particularly to an improved recording method which is suitable for use with CD-R media having recorded on their outermost track only a blank segment, representing, for example, a gap between music pieces, and which allows a track body portion (namely, track-specific recording data), such as a main body of a music piece, to be additionally written onto the track.

CD-R drives for recording onto CD-R media are generally constructed in such a manner that each time data recording is terminated on a track of the disk, information (including position information) of the just-recorded track (hereinafter referred to as "track-descriptive information" for convenience of description) is recorded in the PMA (Program Memory Area) area of the CD-R medium located inwardly of the disk's lead-in area. When recording is resumed on the disk, information indicative of the recording end point of the recorded track is read out from the PMA area so that recording data can be written onto another track following the recording end point of the preceding recorded track. But, in case data recording onto a given track is halted compulsorily due to a power shutdown, or in case writing to the PMA area fails due to some reason although data recording onto a given track has been made appropriately, there would arise a situation where no track-descriptive information for the track is recorded in the PMA area. If the CD-R drive carries on with data writing onto a next track following the recording end point of the preceding track, on the basis of the information read out from the PMA area, without noticing presence of such a track (hereinafter also called a "damaged track"), the data would be written over an already-recorded portion of the preceding track, which thereby unavoidably leads to a recording failure. To avoid such inconveniences, it has been conventional to determine, for each newly loaded or inserted CD-R medium, whether there is any track for which track-descriptive information is not recorded in the PMA area of the medium and, if there is such a track, perform a process for recording the missing track-descriptive information, including the recording end point information, of that track into the PMA area so that accurate data writing is permitted onto a next track following the recording end point of the preceding track.

Further, some audio CD recorders, which directly receive audio signals reproduced from audio source equipment and record the thus-received audio signals onto a CD-R or CD-RW medium in the CD format, are constructed to previously record only blank segments, each representing a gap between music pieces (i.e., silent inter-music-piece signals), so that the main body of each designated music piece can be recorded simultaneously with a user's recording start operation while saving waiting time that would otherwise be required for recording the inter-music-piece signal before the main body of each music piece. If the CD-R medium, having recorded thereon only the inter-music-piece signals via the CD-R recorder, is loaded into the CD-R drive having the above-mentioned function of completing or finalizing a damaged track, the CD-R drive would consider all the tracks to be damaged tracks since no track-descriptive information is recorded in the PMA area although the inter-music-piece signals do constitute part of the corresponding tracks, and thus automatically perform the track finalizing process by recording the track-descriptive information in the PMA area of the CD-R medium. As a consequence, there would be produced "defective tracks" having no recordings of the main body portions of music pieces at all. Further, because such defective tracks each have a zero effective length, they can not comply with the requirement of the CD standard that each track should have a 4 sec. length or more.

SUMMARY OF THE INVENTION

In view of the foregoing, it is an object of the present invention to provide a recording method which is suitable for use with a CD-R medium having recorded on its outermost track only a blank segment representing, for example, a gap between music pieces and which allows a track body portion, such as a main body of a music piece, to be additionally written onto the track.

In order to accomplish the above-mentioned object, the present invention provides an improved CD-R medium recording method which comprises: a step of detecting an outermost track for which track-descriptive information is not yet recorded in a PMA area of a CD-R medium and track-specific recording data are already recorded in a program area by a track-at-once scheme; a step of determining whether recording on the outermost track is terminated at the end of a first-type area, such as a blank segment (inter-music-piece gap) in the case of music recording, where a Q subcode INDEX is at a value of 0 or is made up to a second-type area, such as a program area, where the Q subcode INDEX is at a value of 1 or greater; a step of, if the recording on the outermost track is terminated at the end of the first-type area, additionally writing the track-specific recording onto the outermost track starting at the beginning of the second-type area following the first-type area and then recording the track-descriptive information for the outermost track into the PMA area; and a step of, if the recording on the outermost track is made up to the second-type area, recording the track-descriptive information for the outermost track into the PMA area without additionally writing the track-specific recording data onto the outermost track.

According to another aspect of the present invention, there is provided a CD-R medium recording method which comprises: a step of accessing a lead-in area and PMA area of a CD-R medium to read out information recorded in the lead-in area and PMA area; a step of accessing a location on the CD-R medium immediately following a recording end point represented by the information read out from the lead-in area and PMA area; a step of determining whether or not there is a track recorded by a track-at-once scheme at the accessed location; a step of, if there is the track recorded by the track-at-once scheme at the accessed location, searching for a recording end point of an outermost track and determining whether recording on the outermost track is terminated at the end of a first-type area where a Q subcode INDEX is at a value of 0 or is made up to a second-type area where the Q subcode INDEX is at a value of 1 or greater; a step of, if the recording on the outermost track is terminated at the end of the first-type, additionally writing track-specific recording data onto the outermost track starting at the beginning of the second-type area following the first-type area and then recording track-descriptive information for the outermost track into the PMA area; and a step of, if the recording on the outermost track is made up to the second-type area, recording the track-descriptive information for the outermost track into the PMA area without additionally writing the track-specific recording data onto the outermost track.

Whether or not the recording on the outermost track is terminated at the end of the first-type area, represented by the Q subcode INDEX value 0, may be determined by ascertaining that the recording is terminated at a relative time position of 00:00:00 or 00:00:01 in the first-type area. Further, after completion of the recording into the PMA area, recording onto a next track may be made following the recording end point of the outermost track.

According to the CD format, the INDEX of the Q subcode is recorded as a value "0" in each inter-music-piece gap (blank segment), but, in a main body (track body) segment of each music piece, it is recorded as a value incrementing from "1" up to "99" as necessary. When an outmost track is detected for which track-descriptive information is not yet recorded in a PMA area, it can be known whether the outermost track is one having only an inter-music-piece gap (blank segment) recorded thereon or is a real damaged track that has both the inter-music-piece gap and main body segment of a music piece recorded thereon, by determining whether the recording on the outmost track is terminated at the end of the first-type area represented by the Q subcode INDEX value 0 or is made up to the second-type area represented by the Q subcode INDEX value 1 or greater. If the the outermost track is the one having only an inter-music-piece gap (blank segment) recorded thereon, the main body or track-specific recording data of a music piece is additionally written onto the track before the track is finalized, so that it is possible to avoid formation of a defective track with no music piece main body (track-specific recording data) which does not comply with the CD standard.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

The present invention will now be described in relation to a preferred embodiment where basic principles thereof are applied to an audio CD recorder that is arranged to directly receive audio signals reproduced from audio source equipment and record the received audio signals onto a CD-R or CD-RW medium in the CD format. First, a brief description will be made below about several recording formats of a CD-R medium having audio signals recorded thereon.

Figure 3:
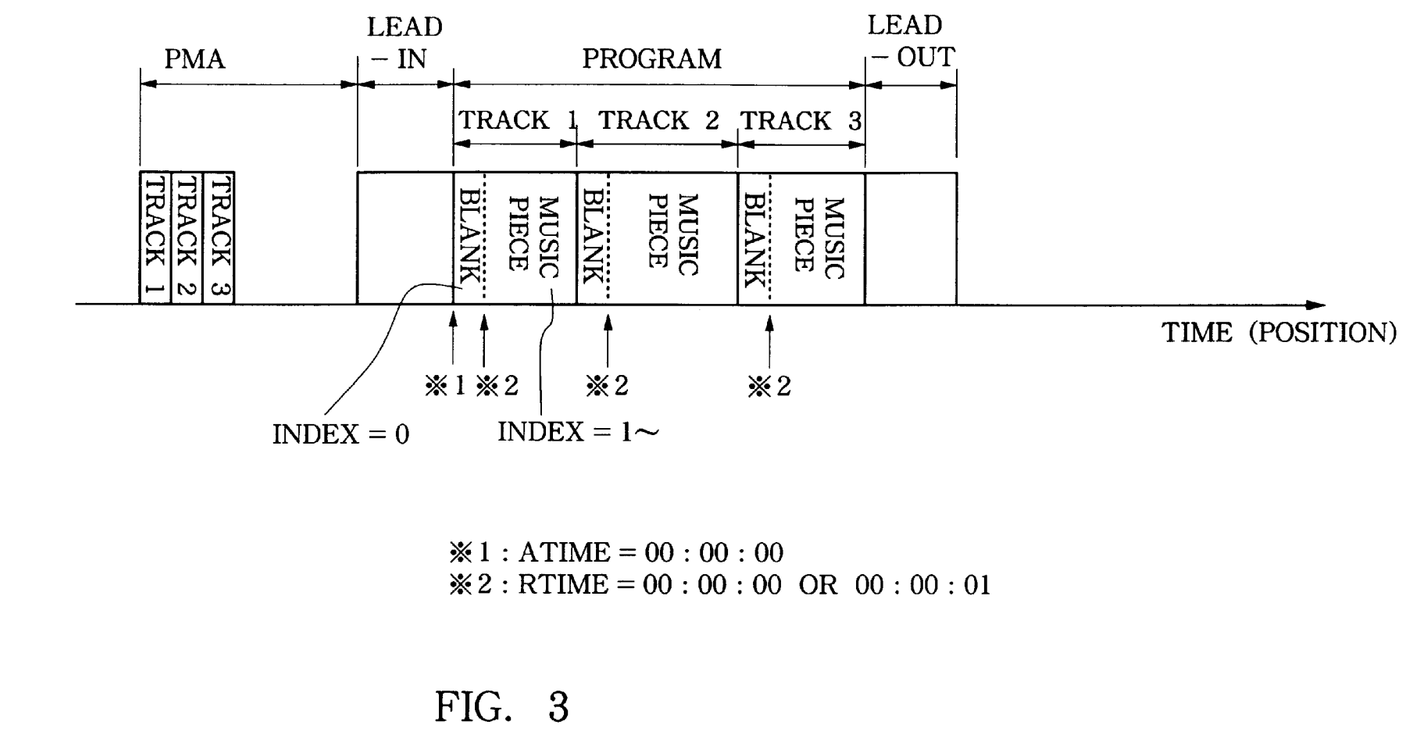
FIG. 3 is a diagram showing an exemplary format of recordings provided on a CD-R medium in a single session mode.

FIG. 3 shows an exemplary format of recordings provided on the CD-R medium in a single session mode. The lead-in area is located 23–25 mm radially outward of the center of the disk, as prescribed by the CD standard. In the lead-in area, there is recorded TOC (Table Of Contents) information that includes information indicative of respective start times of individual tracks, a lead-out start time, etc. In pregrooves of the lead-in area, a start time of the lead-in area is recorded as special ATIP (Absolute Time In-Pregroove) information. The CD standard also prescribes that a start time (absolute time ATIME) of the PMA area should be 1,000 frames before the start time (expressed in absolute time value) of the lead-in area. In the PMA area, there is recorded various track-descriptive information such as respective start and end times (each expressed in absolute time value) of the individual tracks. The special ATIP information of the lead-in area includes information identifying the type of the medium in question (i.e., the CD-R type in this case). Program area following the lead-in area has data of the individual tracks (i.e., track-specific recording data) recorded therein. Each of the tracks includes a blank segment or inter-music-piece gap in the form of a silent signal provided at its leading end (however, such a blank segment may be omitted for the second and succeeding tracks), and the main body of a music piece recorded immediately after the blank segment. INDEX of the Q subcode is recorded as a value "0" in the blank segment and as a non-zero value, sequentially incrementing from "1" to "99" as necessary, in the main body of the music piece. It is also prescribed that a relative time position RTIME (Min:Sec. :Frame) where the "0" INDEX value recording ends (i.e., where the blank segment ends) should be "00:00:00" or "00:00:01". Lead-out area is provided radially outwardly of the program area.

Figure 4:
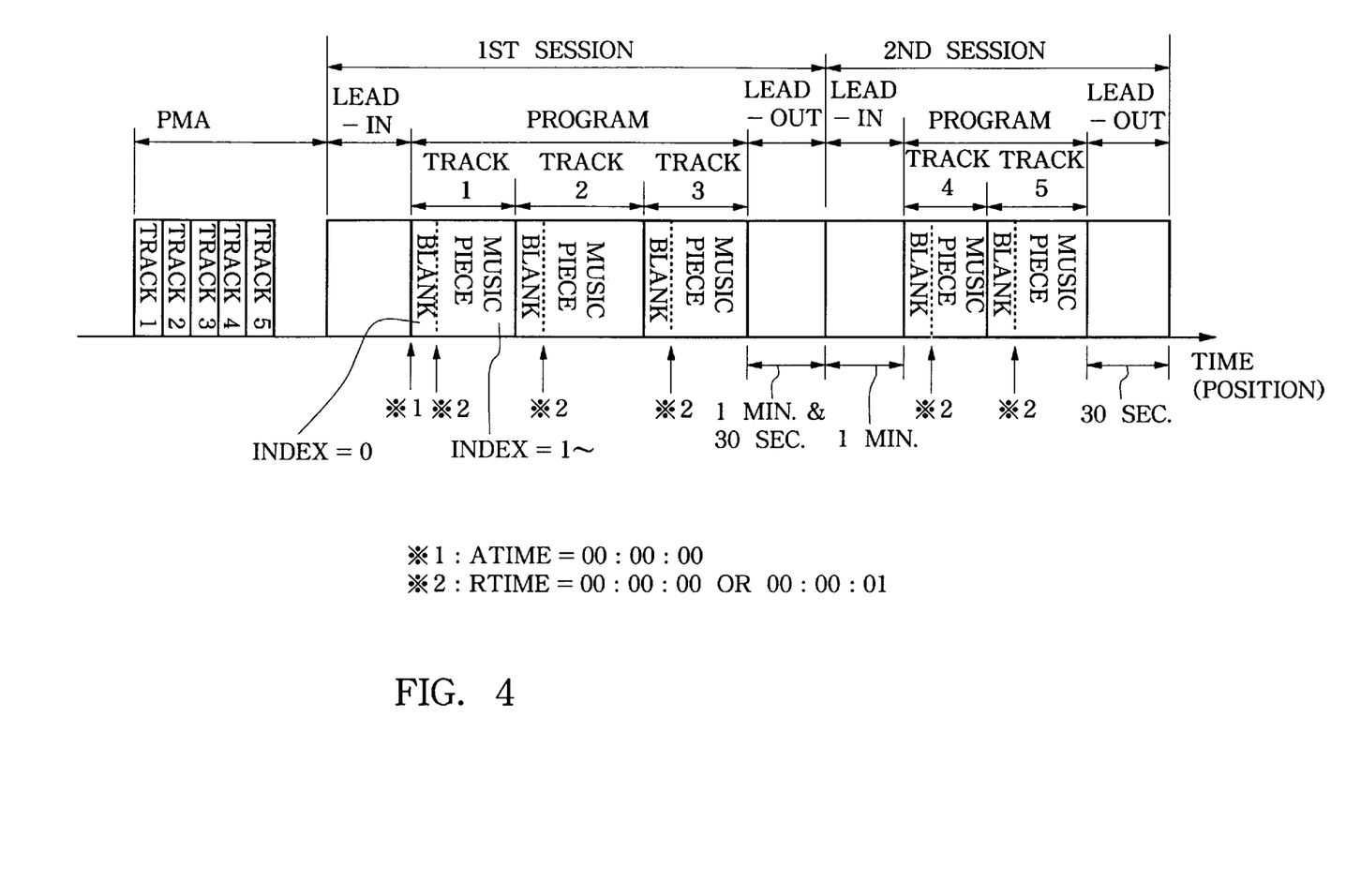
FIG. 4 is a diagram showing an exemplary format of recordings provided on a CD-R medium in a multi-session mode.

FIG. 4 shows an exemplary format of recordings provided on a CD-R medium in a multi-session mode. Each of the successive sessions includes a set of a lead-in area, program area and lead-out area. It is also prescribed that the lead-out area of the first session should have a length of 1 min. and 30 sec. and the lead in and lead-out areas of the second and subsequent sessions should have a length of 1 min. and a length of 30 sec., respectively. Q subcode in the lead-in area includes information indicating that the recording on the disk is in the multi-session mode and information indicative of a start time (expressed in absolute time value) of the program area in the next session.

Figure 5:
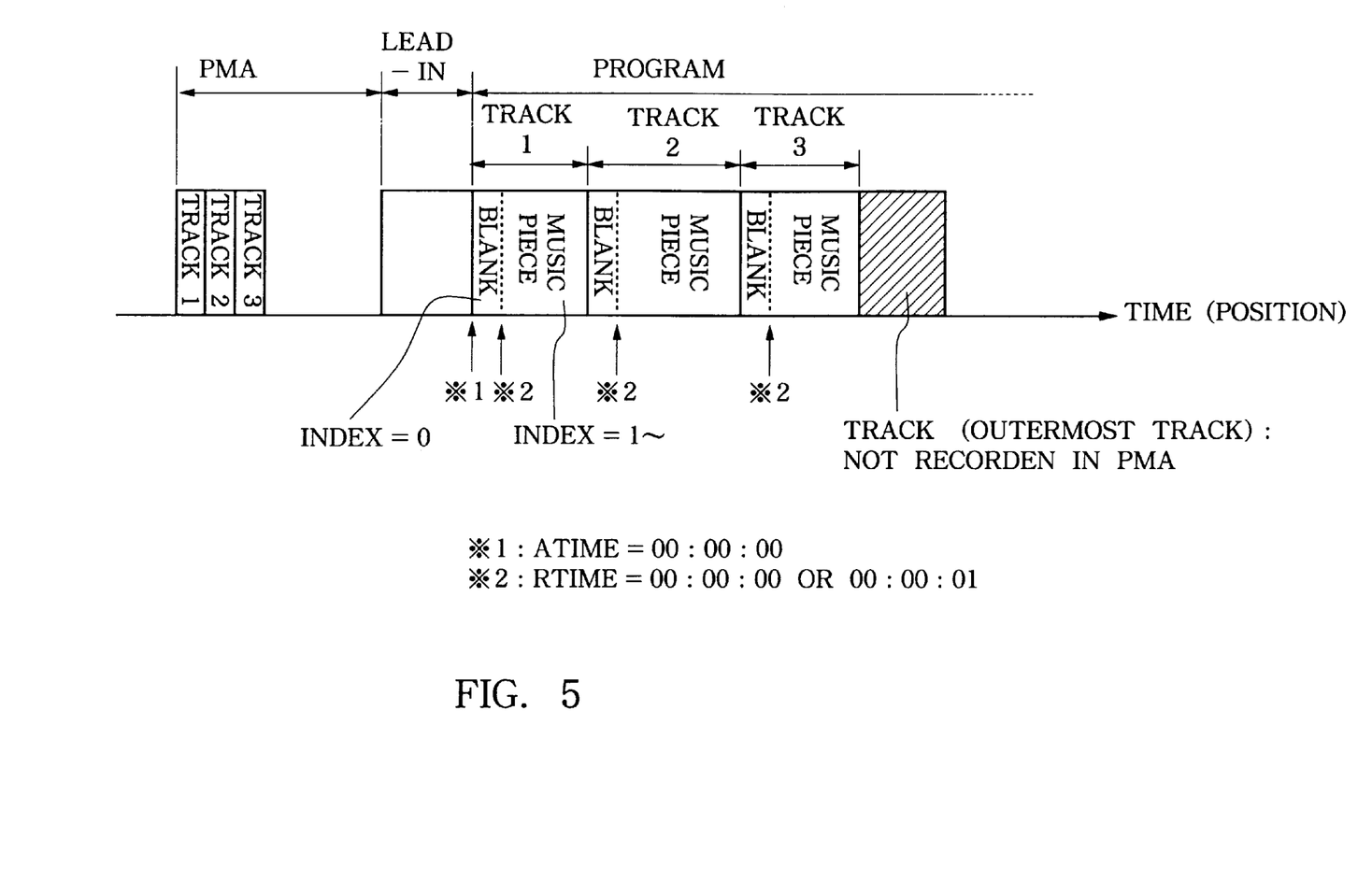
FIG. 5 is a diagram showing an exemplary format of recordings provided on a CD-R medium by a track-at-once scheme and showing a case where there is a track on the medium for which track-descriptive information is not recorded in the PMA area.

FIG. 5 shows an exemplary format of recordings provided on a CD-R medium by a track-at-once scheme and shows a case where there is an outermost track for which track-descriptive information is not recorded in the PMA area. In this case, the lead-in area has no recorded information because the disk has not been finalized. Here, because track 4 following track 3 is a damaged track or has recorded thereon only the inter-music-piece signal (blank segment), no track-descriptive information of track 4 is recorded in the PMA area.

Figure 6:
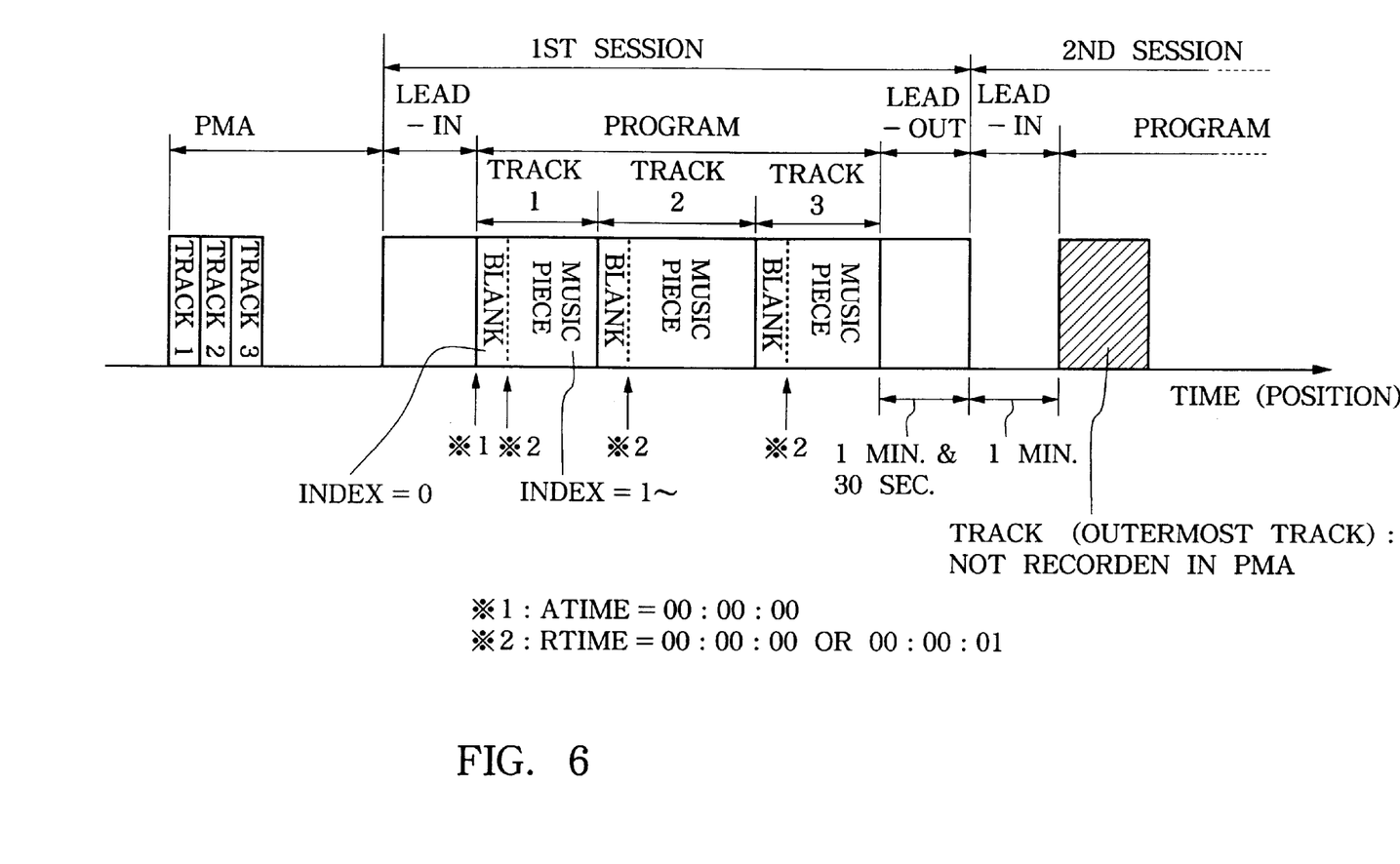
FIG. 6 is a diagram showing an exemplary format of recordings provided on a CD-R medium in a multi-session mode by a track-at-once scheme and showing a case where there is a track on the medium for which track-descriptive information is not recorded in the PMA area.

FIG. 6 shows an exemplary format of recordings provided on a CD-R medium in the multi-session mode by the track-at-once scheme and shows a case where there is a track for which track-descriptive information is not recorded in the PMA area. In this case, the lead-in and lead-on areas of the first session have information recorded therein because the first session has been finalized. However, the lead-in area of the second session has no recorded information because the second session has not been finalized. Here, track 4 recorded at the beginning of the program area in the second session is a damaged track or has recorded thereon only the inter-music-piece signal, so that no track-descriptive information for track 4 is recorded in the PMA area.

Figure 7:
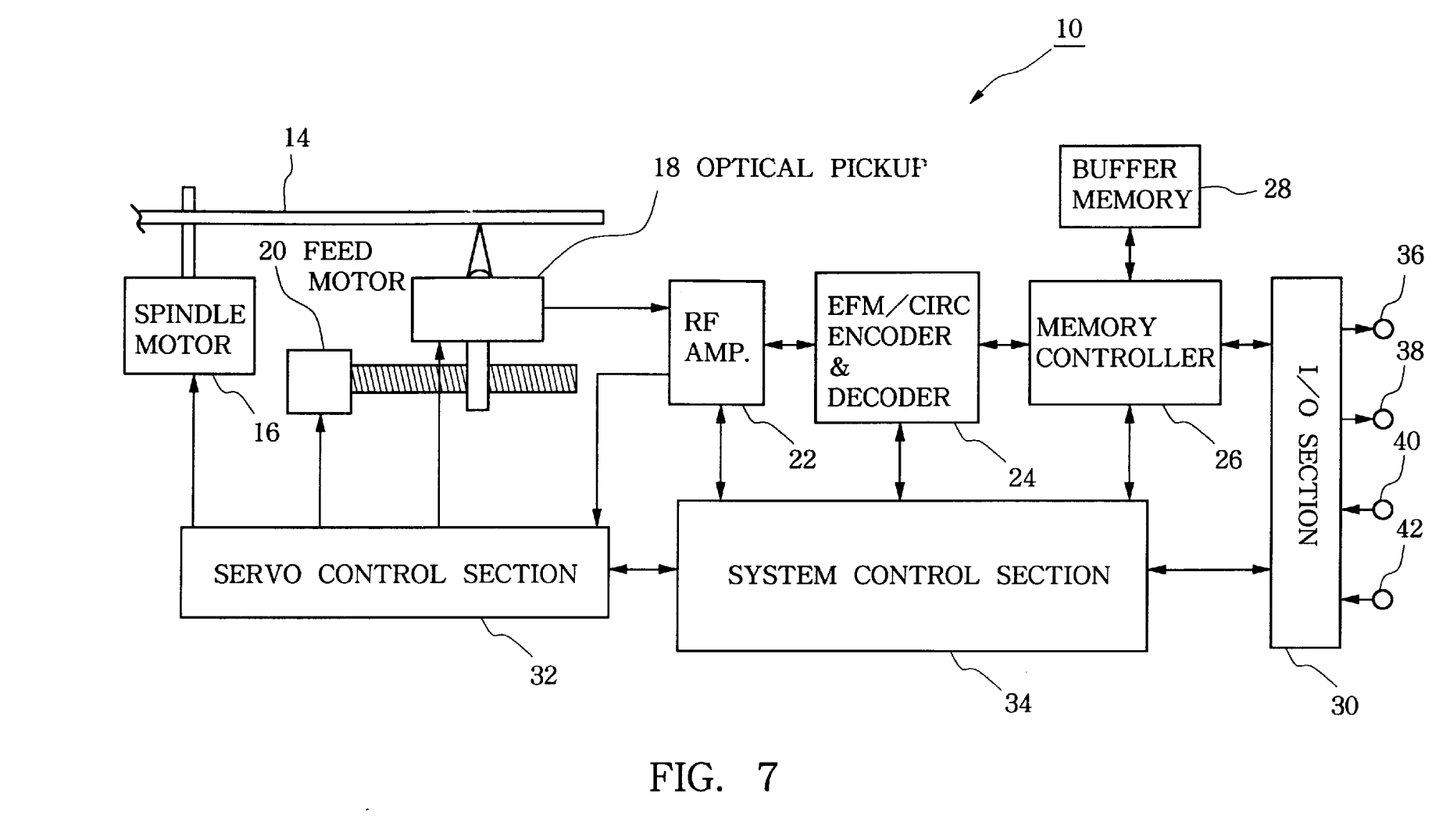
FIG. 7 is a block diagram showing an exemplary hardware setup of the audio CD recorder to which the present invention is applied.

FIG. 7 is a block diagram showing an exemplary hardware setup of the audio CD recorder 10 to which the present invention is applied. Optical disk 14, such as a CD-R, CD-RW or CD, is driven to rotate via a spindle motor 16 so that recording/reproduction of designated information to/from the optical disk 14 is performed by means of an optical pickup 18. In reproduction, the optical pickup 18 is moved by a feed motor 20 in the radial direction of the optical disk 14. Data read out from the optical disk 14 via the optical pickup 18 are delivered via an RF amplifier 22 to an EFM/CIRC (Cross Interleave Reed-Solomon Code) encoder/decoder 24, where they are subjected to EFM demodulation and error correction processes. Main channel data thus demodulated are temporarily stored via a memory controller 26 into a buffer memory 28, and then they are read out from the buffer memory 28 in accordance with internal reference clock pulses in such a manner that unwanted jitters present in the data are eliminated therefrom. Then, the data read out from the buffer memory 28 are each output from a digital output terminal 36 via an input/output section 30. Also, demodulated subcode data are sent to a system control section 34.

In recording, each digital audio signal input via a digital input terminal 40 is subjected to sampling rate conversion and other processes by the input/output section 30, while each analog audio signal input via an analog input terminal 42 is subjected to A/D conversion and other processes by the input/output section 30. Recording signals output from the input/output section 30 are temporarily stored via the memory controller 26 into the buffer memory 28, and then they are read out from the buffer memory 28 in accordance with the internal reference clock pulses of the audio CD recorder 10. Then, the recording signals read out from the buffer memory 28 are subjected to EFM modulation and error correction processes by the EFM/CIRC encoder/decoder 24, and supplied via the RF amplifier 22 to the optical pickup 18, where the recording signals are recorded onto the optical disk 14 by activation of a laser light source.

On the basis of output signals from the RF amplifier 22, a servo control section 32 controls the spindle motor 16 to provide a constant linear velocity and also performs focusing and tracking servo control of the optical pickup 18 as well as feeding control of the feed motor 20. The system control section 34 controls the above-mentioned and various other components of the audio CD recorder 10.

Figure 1:
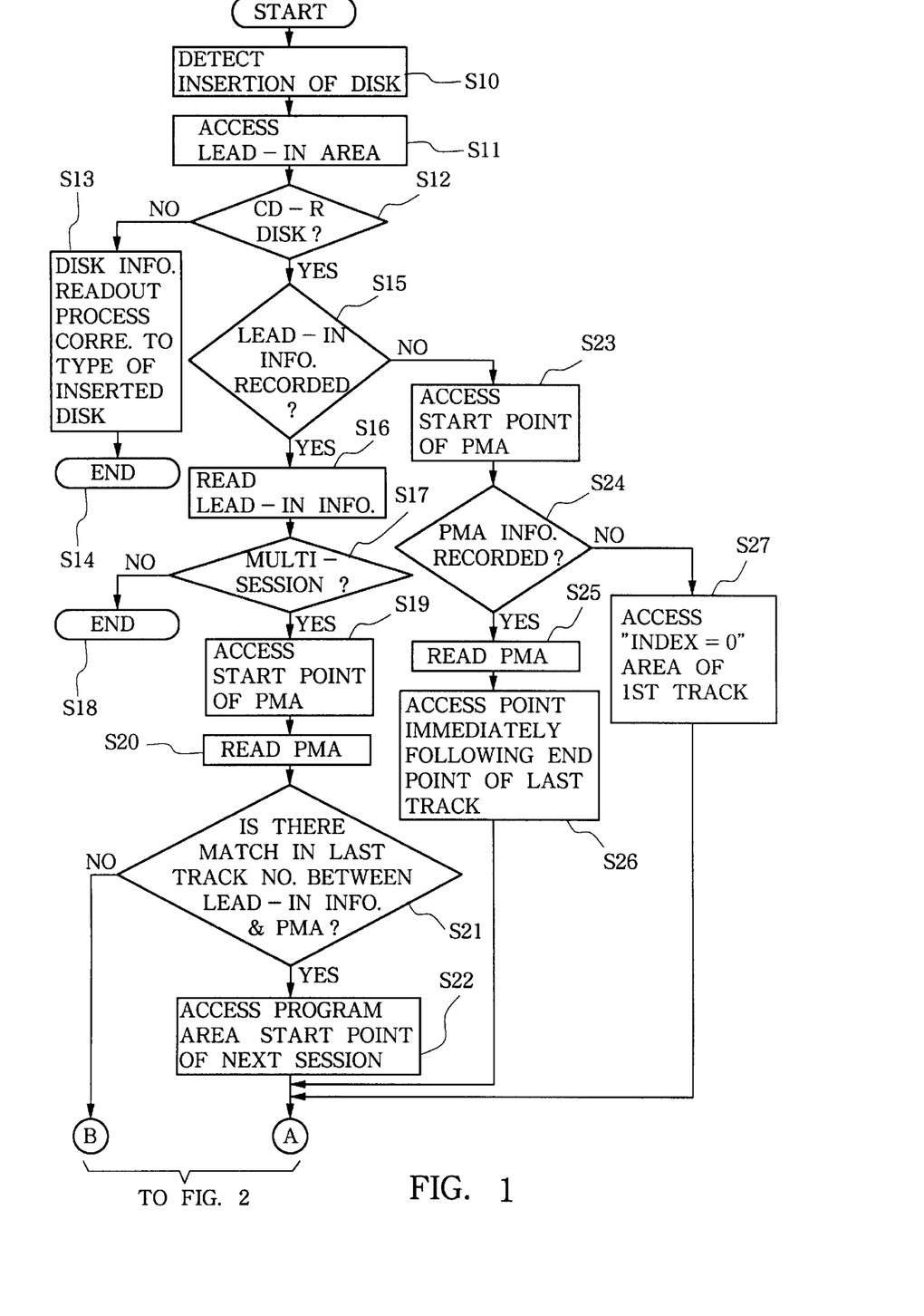
FIG. 1 is a flow chart showing part of an exemplary operational sequence of disk check processing that is automatically carried out by a system control section of an audio CD recorder in response to insertion of an optical disk into the audio CD recorder.
Figure 2:
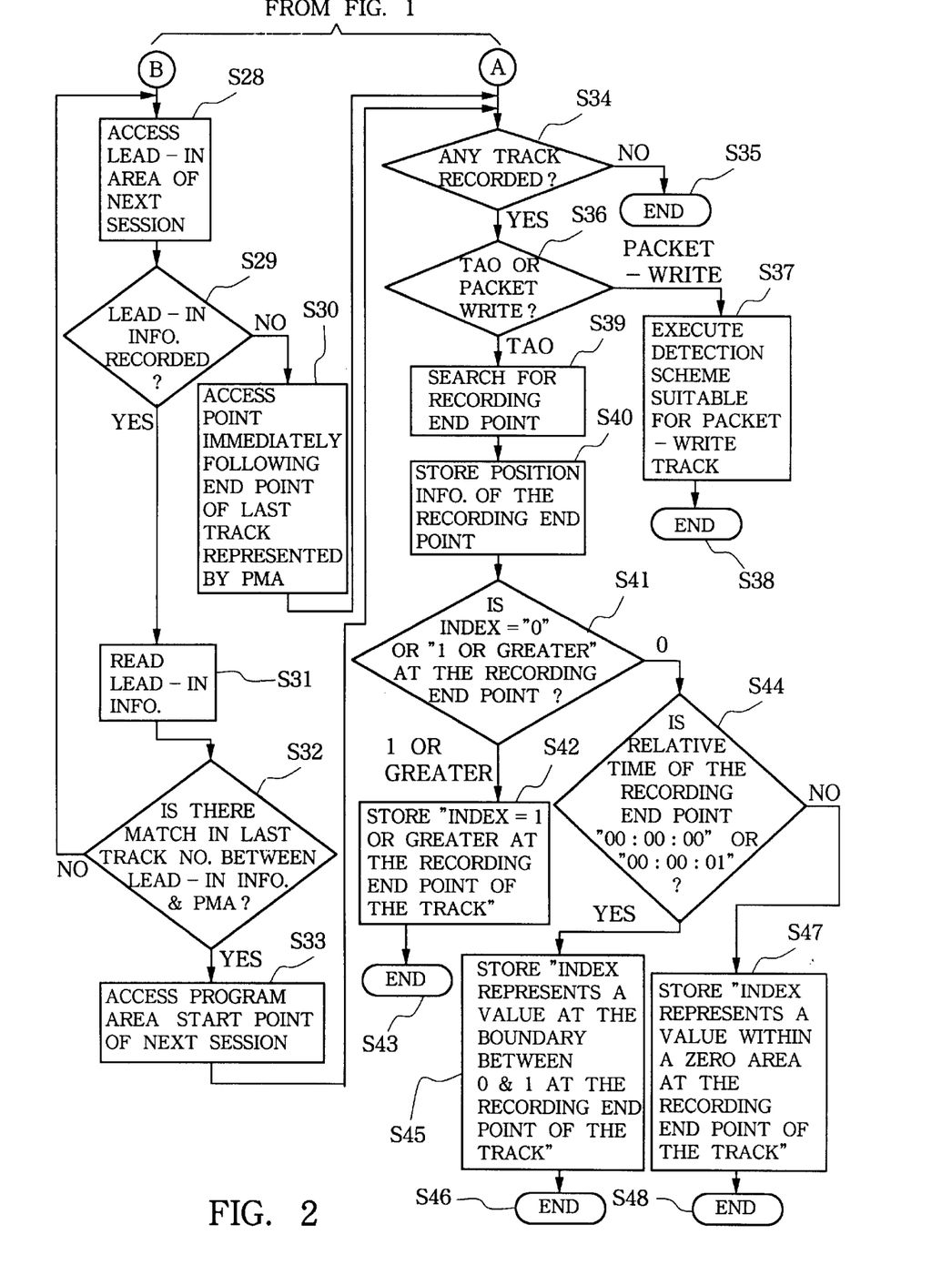
FIG. 2 is a flow chart showing the remaining part of the disk check processing of FIG. 1.

In FIGS. 1 and 2, there is shown an exemplary operational sequence of disk detection (disk check) processing that is automatically carried out by the system control section 34 of FIG. 7 in response to insertion of an optical disk 14 into the audio CD recorder 10. Namely, once the insertion of the optical disk 14 into the audio CD recorder 10 is detected at step S10, the optical disk 18 is moved to face the lead-in area located 23–25 mm located radially outward of the center of the optical disk 14 at step S11, and then a determination is made at step S12 whether or not the inserted optical disk is a CD-R medium. This determination can be made from the disk identifying information included in the special ATIP information recorded on the optical disk 14. If the inserted optical disk is not a CD-R medium, the system control section 34 executes a disk information readout process corresponding to the detected type of the inserted optical disk at step S13, and then the disk detection processing is brought to an end at step S14. If, on the other hand, the inserted optical disk is a CD-R medium as determined at step S12, a further determination is made at step S15 as to whether the optical disk has lead-in information recorded thereon. If the optical disk has lead-in information recorded thereon as determined at step S15, the lead-in information is read into the CD recorder 10 at step S16. Note that in addition to TOC information, the lead-in information includes, as Q subcode information, a start time of the lead-in area, last track number recorded in the session in question, start time of the lead-out area and information indicating whether the recordings on the optical disk are provided in the multi-session recording mode.

At step S17 following step S16, it is ascertained, on the basis of the information read out from the lead-in area, whether the recordings on the optical disk are provided in the multi-session recording mode. If the recordings on the optical disk are not in the multi-session recording mode, the instant processing is terminated at step S18 without performing no additional writing since the optical disk 14 has been finalized. If, on the other hand, the recordings on the optical disk are not in the multi-session recording mode as determined at step S17, a point located 1,000 frames before the start time of the lead-in area is calculated on the basis of the lead-in start time information read out from the lead-in area, and access is made at step S19 to the calculated point, representing a start point of the PMA area, so as to read out all of the PMA information recorded in the PMA area at step S20. At following step S21, a determination is made as to whether the last track number represented by the PMA information and the last track number represented by the lead-in information matches with each other. If answered in the affirmative at step S21, a point located 2 min. and 30 sec. after the start time of the lead-out area read out from the lead-in area (i.e., a length equal to a sum of the lengths of the lead-out area in the first session and lead-in area of in second session), namely, a start point of the first track in the second session, is calculated so as to access a point immediately following the thus-calculated point (i.e., a start point of the program area in the second session) at step S22. The start point information of the program area in the second session, read out from the lead-in area, may be used as it is, instead of calculating the start point of the first track.

If the inserted optical disk 14 has no lead-in information recorded thereon as determined at step S15, the start time of the lead-in area is obtained from the ATIP information of the lead-in area, a point located 1,000 frames before the start time of the lead-in area (i.e., the start time of the PMA area) is calculated, and access is made to the calculated start point of the PMA area, at step S23. Then, it is further determined at step S24 whether or not PMA information is recorded at the accessed start point. If PMA information is recorded at the accessed start point, all the PMA information is read out at step S25. Then, at step S26, access is made to a point immediately following the end point of the last track represented by the read-out PMA information. If, however, no PMA information is recorded at the accessed start point as determined at step S24, access is made at step S27 to the start point of the first track (i.e., the "00 min. :00 sec. :00 frame" point represented by the position information of the ATIP information).

If it has been determined at step S21 that the last track number represented by the PMA information and the last track number represented by the lead-in information do not match with each other (i.e., the last track number represented by the PMA information is greater than the last track number represented by the lead-in information), this that recording has been made in the second session, so that access is made to an appropriate location within the lead-in area of the second session at step S28. The lead-in area of the second session may be obtained as an area covering a length of 1 min. and 30 sec. from the start time of the first session lead-out area that is recorded in the Q subcode of the first session lead-in area. The lead-in area of the second session may also be obtained as an area covering a one-min. length preceding the start time of the second session program area recorded in the Q subcode of the first session lead-in area.

Once access has been made to the appropriate location of the lead-in area of the second session at step S28, a further determination is made at step S29 as to whether lead-in information is recorded in the second session lead-in area. If no lead-in information is recorded in the second session lead-in area, then access is made at step S30 to a point immediately following the end point of the last track represented by the PMA information. If, on the other hand, lead-in information is recorded in the second session lead-in area as determined at step S29, the recorded lead-in information is read out at step S31, and it is further determined at step S32 whether the last track number represented by the PMA information and the last track number represented by the lead-in information matches with each other. If it has been determined at step S32 that the last track numbers represented by the PMA information and lead-in information do not match with each other (i.e., the last track number represented by the PMA information is still greater than the last track number represented by the lead-in information), this means that recording has been made in the third session, so that access is made to an appropriate location within the lead-in area of the third session at step S28. These operations are repeated until no more lead-in information is detected at step S29 or a match is detected at step S32 between the last track numbers represented by the PMA information and lead-in information. Once such a match is detected at step S32 between the last track numbers represented by the PMA information and lead-in information, a point located 1 min. and 30 sec. after the start time of the session represented by the lead-in information (i.e., a length equal to a sum of the lengths of the lead-out area of the second or subsequent session and lead-in area of a next session), namely, a start point of the first track in the next session, is calculated so as to access a point immediately following the thus-calculated location at step S33. The start point information of the program area in the next session that is-read out from the lead-in area of the session immediately preceding the next session may be used as it is, instead of calculating the start point.

Once access has been made to the respective predetermined location at step S22, S26, S27, S30 or S33, it is determined at step S34 whether or not any track has been recorded at that location, i.e., whether an EFM signal has been detected at that location. If no recorded track has been recorded at that location as determined at step S34, this means that there is no track for which track-descriptive information is not recorded in the PMA area (i.e., there is no damaged track or track with only an inter-music piece signal recorded thereon), so that the disk detection processing is terminated at step S35. If, on the other hand, there is a recorded track as determined at step S34, then it is further determined at step S36 whether the track has been recorded by the track-at-once ("TAO") scheme or packet-write scheme. The determination at step S36 may be made on the basis of a CONTROL value of the Q subcode; that is, if the four-bit CONTROL value is "00X0" or "00X1" (i.e., if the four-bit CONTROL value represents "audio"), it is determined that the track has been recorded by the track-atonce scheme, while the CONTROL value is "00X1", it is determined that the track has been recorded by the packet-write scheme. If the track has been recorded by the packet-write scheme as determined at step S36, a detection scheme suitable for the packet-write track is executed at step S37 and the instant disk detection processing is brought to an end at step S38. If, on the other hand, the track has been recorded by the track-at-once scheme, a search is made for a recording end point of the track at step S39. Such a recording end point may be found as a location at which the EFM signal recording ceases to be detected.

Once the recording end point of the track has been found, position information indicative of the recording end point is stored into memory at step S40, and a determination is made at step S41 whether the INDEX of the Q subcode is "0" or "1" at the recording end point. If the INDEX is "1" at the recording end point as determined at step S41, the track in question is judged to be a damaged track, so that information indicating "INDEX=1 or greater at the recording end point of the track" is stored into memory at step S42. Following step S42, the instant disk detection processing is terminated at step S43. If, on the other hand, the INDEX is "0" at the recording end point, then a further determination is made at step S44 as to whether or not the relative time (RTIME of the Q subcode) at the recording end point is either "00:00:00" or "00:00:01". If answered in the affirmative at step S44, information "the INDEX represents a value at the boundary between 0 and 1 at the recording end point of the track" is stored into memory at step S45, and the instant disk detection processing is terminated at step S46. If the relative time at the recording end point is neither "00:00:00" nor "00:00:01" as determined at step S44, information "the INDEX represents a value within a zero area at the recording end point of the track" is stored into memory at step S47, and the instant disk detection processing is terminated at step S48.

Figure 8:
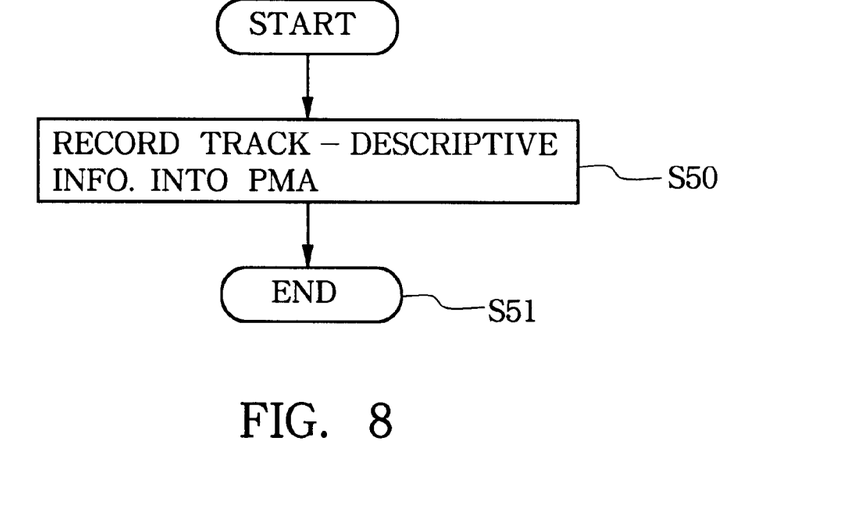
FIG. 8 is a flow chart showing an example of a recording control process performed by the system control section, in response to a recording instruction, when a damaged track has been detected on the medium inserted in the audio CD recorder.
Figure 9:
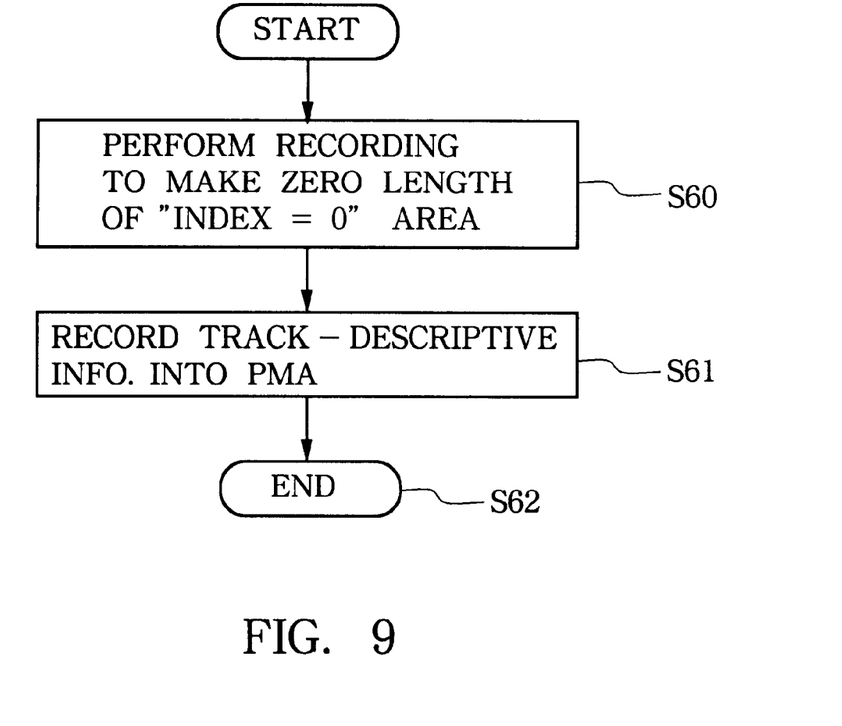
FIG. 9 is a flow chart shows another example of the recording control process performed by the system control section, in response to a recording instruction, when it has been determined that recording has been terminated at the end of an area where a Q subcode INDEX is at a value of "0".

After completion of the above-described disk detection processing, the system control section 34 performs the following recording control whenever a recording instruction is given. FIG. 8 shows an example of the recording control process performed by the system control section 34 in response to a recording instruction when a damaged track has been detected (i.e., when the disk check processing has been terminated at step S43 of FIG. 2). Namely, in the case of FIG. 8, track-descriptive information of the outermost track is recorded into the PMA area with no additional data writing made to the track, at step S50, and thus the track is finalized at step S51. Further, FIG. 9 shows another example of the recording control process performed by the system control section 34 in response to a recording instruction when it has been determined that recording has been terminated at the end of the INDEX "0" area (i.e., when the disk check has been terminated at step S46 of FIG. 2). Namely, in the case of FIG. 9, recording is performed, at step S60, to make zero the length of the "INDEX=0" area; that is, at step S60, the INDEX is immediately set to the value "1" to additionally write externally-input audio signals, i.e. the main body of the music piece. Upon completion of the additional audio data writing at step S60, track-descriptive information of the track in question is recorded into the PMA area at step S61 and the track is finalized at step S62. Thus, it is possible to reliably prevent formation of a defective track where no main body of the music piece is present. After the track has been finalized through the recording control of FIG. 8 or FIG. 9, additional audio data writing can be made to a next track as necessary.

Whereas the preferred embodiment of the present invention has been described as applied to an audio CD recorder, the basic principles of the invention are applicable to any type of conventional CD-R drive that can operate by being connected to a host computer, for example, in the form of a personal computer.

What is claimed is:

1. A CD-R medium recording method comprising:

a step of detecting an outermost track for which track-descriptive information is not yet recorded in a PMA area of a CD-R medium and track-specific recording data are already recorded in a program area by a track-at-once scheme;

a step of determining whether recording on said outermost track is terminated at the end of a first-type area where a Q subcode INDEX is at a value of 0 or is made up to a second-type area where the Q subcode INDEX is at a value of 1 or greater;

a step of, if the recording on the outermost track is terminated at the end of the first-type area, additionally writing the track-specific recording onto said outermost track starting at the beginning of the second-type area following the first-type area and then recording the track-descriptive information for said outermost track into the PMA area; and a step of, if the recording on the outermost track is made up to the second-type area, recording the track-descriptive information for said outermost track into the PMA area without additionally writing the track-specific recording data onto said outermost track.

2. A CD-R medium recording method as claimed in claim 1 wherein that the recording on said outermost track is terminated at the end of the first-type area, represented by the Q subcode INDEX at the value 0, is determined by ascertaining that the recording is terminated at a relative time position of 00:00:00 or 00:00:01 in the first-type area.

3. A CD-R medium recording method as claimed in claim 1 wherein after completion of recording into the PMA area, recording onto a next track is made following a recording end point of said outermost track.

4. A CD-R medium recording method comprising:

a step of accessing a lead-in area and PMA area of a CD-R medium to read out information recorded in the lead-in area and PMA area;

a step of accessing a location on the CD-R medium immediately following a recording end point represented by the information read out from the lead-in area and PMA area;

a step of determining whether or not there is a track recorded by a track-at-once scheme at the accessed location;

a step of, if there is the track recorded by the track-at-once scheme at the accessed location, searching for a recording end point of an outermost track and determining whether recording on said outermost track is terminated at the end of a first-type area where a Q subcode INDEX is at a value of 0 or is made up to a second-type area where the Q subcode INDEX is at a value of 1 or greater;

a step of, if the recording on said outmost track is terminated at the end of the first-type, additionally writing track-specific recording data onto said outermost track starting at the beginning of the second-type area following the first-type area and then recording track-descriptive information for said outmost track into the PMA area; and a step of, if the recording on said outermost track is made up to the second-type area, recording the track-descriptive information for said outermost track into the PMA area without additionally writing the track-specific recording data onto said outermost track.

5. A CD-R medium recording method as claimed in claim 4 wherein that the recording on said outermost track is terminated at the end of the first-type area, represented by the Q subcode INDEX at the value 0, is determined by ascertaining that the recording is terminated at a relative time position of 00:00:00 or 00:00:01 in the first-type area.

6. A CD-R medium recording method as claimed in claim 4 wherein after completion of recording into the PMA area, recording onto a next track is made following a recording end point of said outermost track.

* * * * *